United States Patent [19]

Inagaki

[11] Patent Number: 4,578,811
[45] Date of Patent: Mar. 25, 1986

[54] KEY-IN DEVICE

[75] Inventor: Naoki Inagaki, Tokyo, Japan

[73] Assignee: Casio Computer Co., Ltd., Tokyo, Japan

[21] Appl. No.: 532,501

[22] Filed: Sep. 14, 1983

[30] Foreign Application Priority Data

Sep. 21, 1982 [JP] Japan .................. 57-164259

[51] Int. Cl.⁴ .............................. G06K 9/00
[52] U.S. Cl. ......................... 382/11; 382/13; 382/24
[58] Field of Search ................ 382/3, 11, 13, 24

[56] References Cited

U.S. PATENT DOCUMENTS

| | | | |
|---|---|---|---|
| 4,199,751 | 4/1980 | Piguet | 382/13 |
| 4,232,290 | 11/1980 | Yasuda et al. | 382/13 |
| 4,365,235 | 12/1982 | Greanias et al. | 382/24 |

FOREIGN PATENT DOCUMENTS

| | | |
|---|---|---|
| 1480066 | 7/1977 | United Kingdom . |
| 2029619 | 3/1980 | United Kingdom . |
| 1584479 | 2/1981 | United Kingdom . |
| 2092352 | 8/1982 | United Kingdom . |
| 2104698 | 3/1983 | United Kingdom . |

Primary Examiner—Leo H. Boudreau
Attorney, Agent, or Firm—Frishauf, Holtz, Goodman & Woodward

[57] ABSTRACT

A key-in device has a key-in section with a matrix array of keys. A key-actuated signal corresponding to a handwritten character input by the key-in section is input to an input pattern memory of a character recognition section, where an input pattern is formed and stored. The character recognition section has a standard pattern memory, having stored the standard pattern of a character to be recognized. A first feature detecting section extracts feature data from the input pattern in the input pattern memory. A first matching section detects a standard pattern coincident with the feature data extracted from the first standard pattern memory, and produces the character data input by the key-in section as a recognizable character.

14 Claims, 20 Drawing Figures

FIG. 4(a)
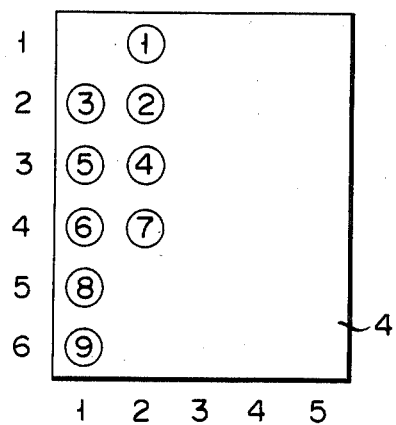
FIG. 4(b)
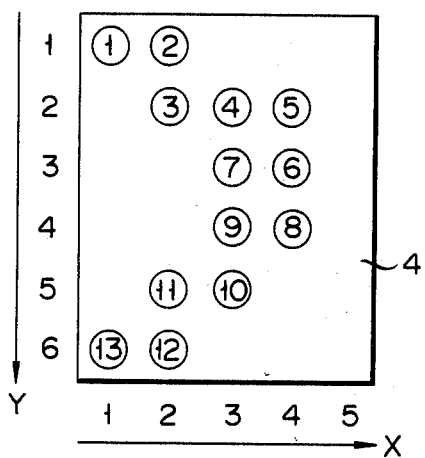
FIG. 5
| N | | X | Y |
|---|---|---|---|
| 1 | ① | ( 2 , 1 ) |
| 2 | ② | ( 2 , 2 ) |
| 3 | ③ | ( 1 , 2 ) |
| 4 | ④ | ( 2 , 3 ) |
| 5 | ⑤ | ( 1 , 3 ) |
| 6 | ⑥ | ( 1 , 4 ) |
| 7 | ⑦ | ( 2 , 4 ) |
| 8 | ⑧ | ( 1 , 5 ) |
| 9 | ⑨ | ( 1 , 6 ) |
| 10 | | STROKE END DATA |
| 11 | ① | ( 1 , 1 ) |
| 12 | ② | ( 2 , 1 ) |
| 13 | ③ | ( 2 , 2 ) |
| ⋮ | ⋮ | ⋮ |
| 21 | ⑪ | ( 2 , 5 ) |
| 22 | ⑫ | ( 2 , 6 ) |
| 23 | ⑬ | ( 1 , 6 ) |
| 24 | | CHARACTER END DATA |

F I G. 6
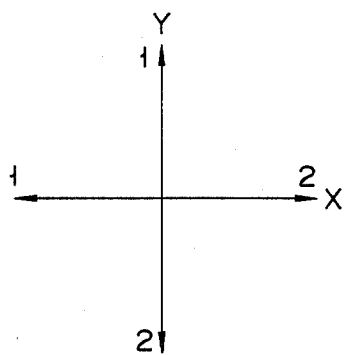
F I G. 7(a)
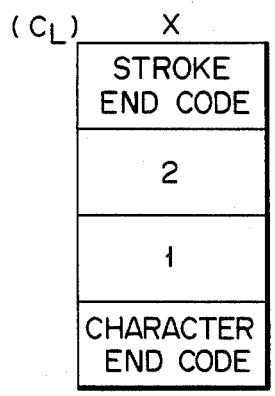
F I G. 7(b)
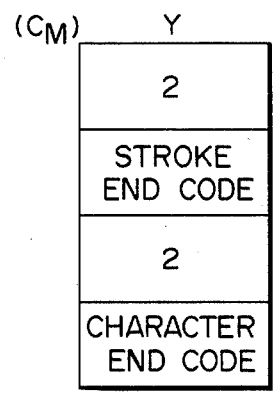
F I G. 8(a)
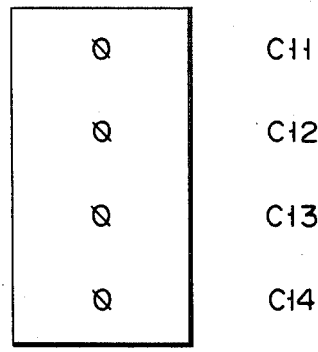
F I G. 8(b)
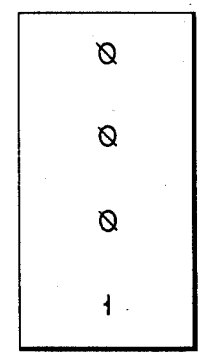

KEY-IN DEVICE

BACKGROUND OF THE INVENTION

The present invention relates to a key-in device for keying in symbolic marks, such as alpha numeric characters, by tracing or depicting the marks on a keyboard having a matrix array of keys.

Recently, various electronic devices for inputting alpha numeric characters through individual key operations have been marketed, such as translators and electronic calculators capable of preparing BASIC programs. Such electronic devices require a considerable number of keys, since the keys required must be equal in number to the alpha numeric characters to be keyed in. This fact has created many problems. For example, the required keys would occupy a large area on the keyboard. Also, it often takes a long time to find a desired key, which would lead to poor operability of the electronic device.

To cope with such problems, an input device with a digitizer which inputs characters by depicting or writing the characters with a pen has been proposed. The digitizer would be of a coordinates input type, using an electromagnet coupling tablet and a pressure sensitive rubber.

Due to its inherent structural features, such an electronic device is complicated in structure and has a high manufacturing cost. Additionally, in recognizing input data, such as characters, a great quantity of information is required, e.g., from 0 to 500 items for each of the X and Y coordinates. As a result, the data recognition processing is complicated and time consuming. Moreover, the memory used must have a large capacity.

SUMMARY OF THE INVENTION

Accordingly, a primary object of the present invention is to provide a key-in device with a simple structure, which device is capable of inputting characters in a handwriting manner by using ten keys, function keys, etc., which keys are generally provided in ordinary calculators.

To achieve the above object, a key-in device is provided which is comprised of: a key-in section with a matrix array of keys; memory means connected to the key-in section, which, when a character is input by the handwriting method, receives coordinate data corresponding to individual actuated keys in the key-in section, forms an input pattern on the character input by the handwriting method, on the basis of the coordinate data, and stores the input pattern; standard pattern memory means for previously storing a standard pattern corresponding to a character to be recognized; and means connected to the memory means and standard pattern memory means, which means forms feature data on the basis of the input pattern stored in the memory means, selects character data corresponding to the input pattern, by picking the standard pattern coincident with the feature data from the standard pattern memory means, and recognizing the character data input by the key-in section.

With such an arrangement, the key-in device according to this invention can recognize characters input in a handwriting manner, displaying them as characters with a standard predetermined configuration. Said key-in device can also be simple in structure, using keys such as those used in ordinary calculators.

BRIEF DESCRIPTION OF THE DRAWINGS

FIGS. 4(a) and 4(b) illustrate the sequential order of the key operations of strokes when a character is input in a handwriting manner;

FIG. 5 illustrates coordinate data, such as that given by the key operations shown in FIGS. 4(a) and 4(b);

FIG. 6 is a view illustrating the stroke directions on the coordinates;

FIGS. 7(a) and 7(b) show the patterns of extracted stroke features corresponding to a character input pattern in the first feature detecting section 13 shown in FIG. 3;

FIGS. 8(a) and 8(b) show stroke feature patterns extracted in the second feature detecting section 16 shown in FIG. 3;

DETAILED DESCRIPTION OF THE PREFERRED EMBODIMENT

Figure 1:
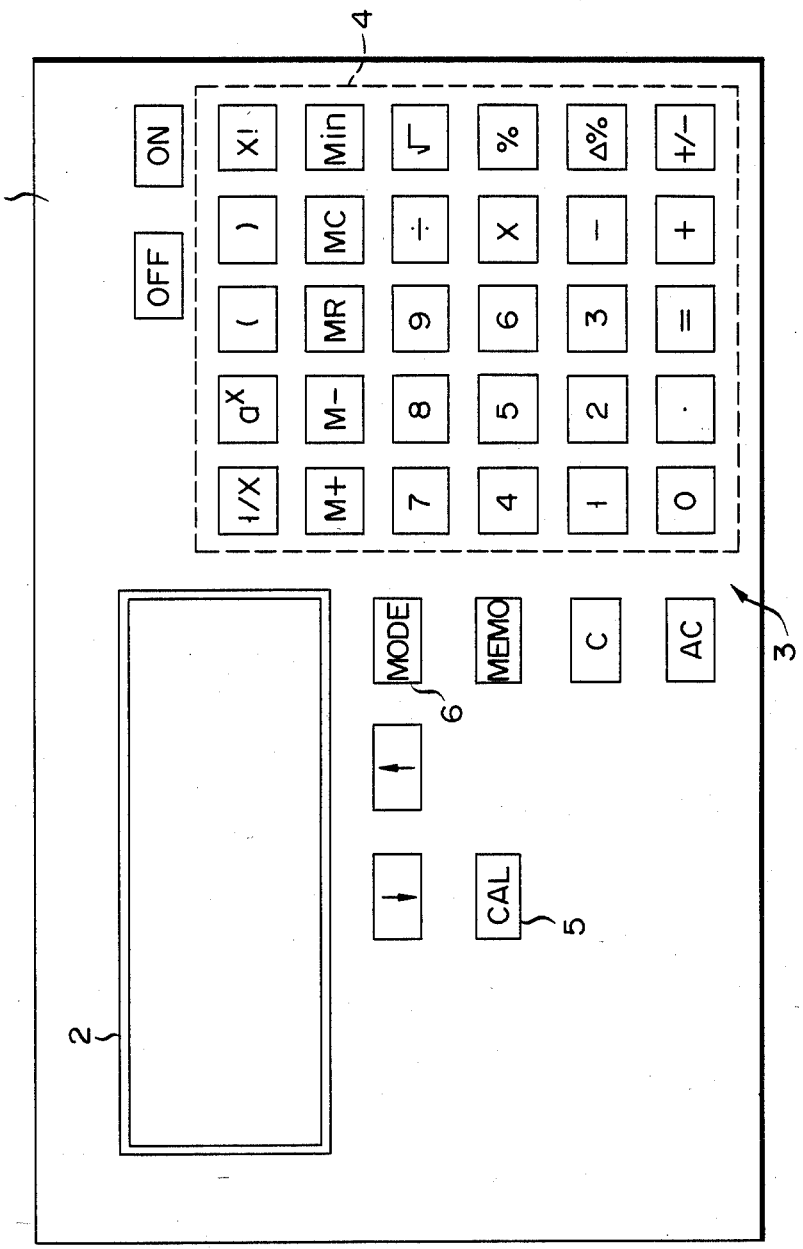
FIG. 1 is an overview of an electronic device in which a key-in device according to the present invention is applied to a calculator.

The example to follow is a calculator into which a key-in device according to the present invention has been incorporated. In FIG. 1 illustrating an outside view of the calculator, a main frame 1 is provided with a display section 2 and a keyboard 3 on the obverse side. The display section 2, using liquid crystal display elements, can display numerals 0-9, alphabetic characters A-Z, and arithmetic symbols +, −, ×, and ÷. Each of these symbolic marks is formed in a matrix array of 5 dots×7 dots. The keyboard 3 includes a finger actuation section 4 having a key matrix array of 5×6, including ten keys and function keys. The keyboard 3 further includes [ON] and [OFF] keys for power on and off functions; an [AC] (all clear) key used in clearing registers for display and arithmetic operations; a [C] (clear) key for clearing the contents of the display register; a [MEMO] key for successively storing data displayed in the display section 2 in a plurality of memory registers for each key operation; [↑] and [↓] keys, which are pushed to increment or decrement the address of the memory registers, to thereby read out the contents of the register; a [CAL] (calculate) key 5, which is operated to calculate a formula input by the finger actuation section 4 and display results of the calculation; and a [MODE] key 6 for selecting a mode 1 or a mode 2. Mode 1 sets up a calculation mode in which the keys respectively exhibit their own functions. Mode 2 sets up a handwriting input mode in which hand written characters may be input from the finger actuation section 4.

In a handwriting input mode, numerals 0-9, alphabetic characters A-Z, and the arithmetic symbols +, −, × and ÷ may be relatively displayed by tracing them on the 5×6 key array in the finger actuation section 4. A character input by finger tracing is recognized by an internal circuit. If the [CAL] key 5 is actuated and "5+2=" is written with the finger, the internal circuit recognizes these numerals and the arithmetic symbols, to calculate this formula and display its answer.

Figure 2:
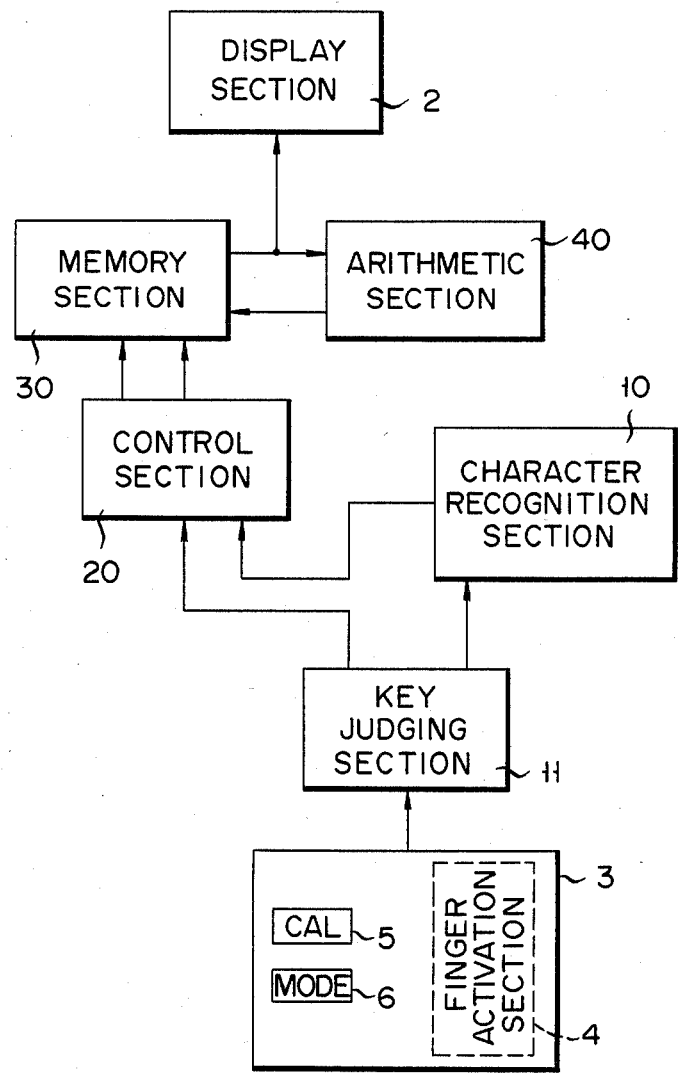
FIG. 2 is a block diagram illustrating an embodiment of the present invention.

An electronic circuit arrangement installed in the main frame 1 may now be described with reference to FIG. 2. In FIG. 2, a key judging section 11 responds to the key actuation on the keyboard 3, to find the key operated and to generate the data input by the key actuated. Specifically, the key judging section 11 in the calculation mode generates a key code representing the function originally assigned to each key and sends it to a control section 20. In a handwriting mode, it generates coordinate data of the operated data in the finger actuation section 4 and sends it to a character recognition section 10. The character recognition section 10 recognizes characters input by the finger actuation section 4 on the basis of the coordinate data, and sends the character data to the control section 20. This will subsequently be described in detail. The control section 20 executes various types of control operations on the keyed in data or the character data. For example, the control section 20 controls the addressing of each register in a memory section 30, the data read from and written into the memory section 30, and the loading of key codes and character data into appropriate registers in the memory section 30.

The memory section 30 includes a display register, a plurality of arithmetic registers and a plurality of memory registers (not shown). The contents of the display register are sent, under the control of the control section 20, to the display section 2, where the contents are displayed in a usual manner. Under the control of the control section 20, the contents of the appropriate register in the memory section 30 are read out into an arithmetic section 40. In the arithmetic section 40, the contents of the register are arithmetically processed. The results of the arithmetic processing are again stored in the appropriate register with the memory section 30.

When the calculation mode is set up by means of the [MODE] key 6, the circuits in the calculator may be caused to operate in the same manner as the calculator operates in the usual calculating mode, by actuating the ten keys and function keys on the keyboard 3. When the handwriting mode is set up by operating the [MODE] key 6, by actuating the keys in the finger actuation section 4 on the keyboard 3, the corresponding coordinates data is output from the key judging section 11 to the character recognition section 10. In the character recognition section 10, the character input from the finger activation section 4 is recognized. Then, the character recognition section 10 produces the character data corresponding to the character recognized therein, for transfer to the control section 20. The control section 20 loads the character data into the display register within the memory section 30. The contents of the display register are set to the display section 2, which in turn displays the character. Under such conditions, if the [MEMO] key is operated, the contents of the display register are transferred to the memory register (not shown) in the memory section 30, for storage. If a sentence is stored therein, the calculator can be used as a simple memorandum. After the operation of the [CAL] key 5, if the numerals and arithmetic symbols, constituting an arithmetic formula, are input from the finger actuation section 4, the control section 20 allows for the input of character data corresponding to the numerals or arithmetic symbols output from the character recognition section 10, and executes a control operation, as in the calculation mode. Then, the display section 2 displays the results of the arithmetic operation.

Figure 3:
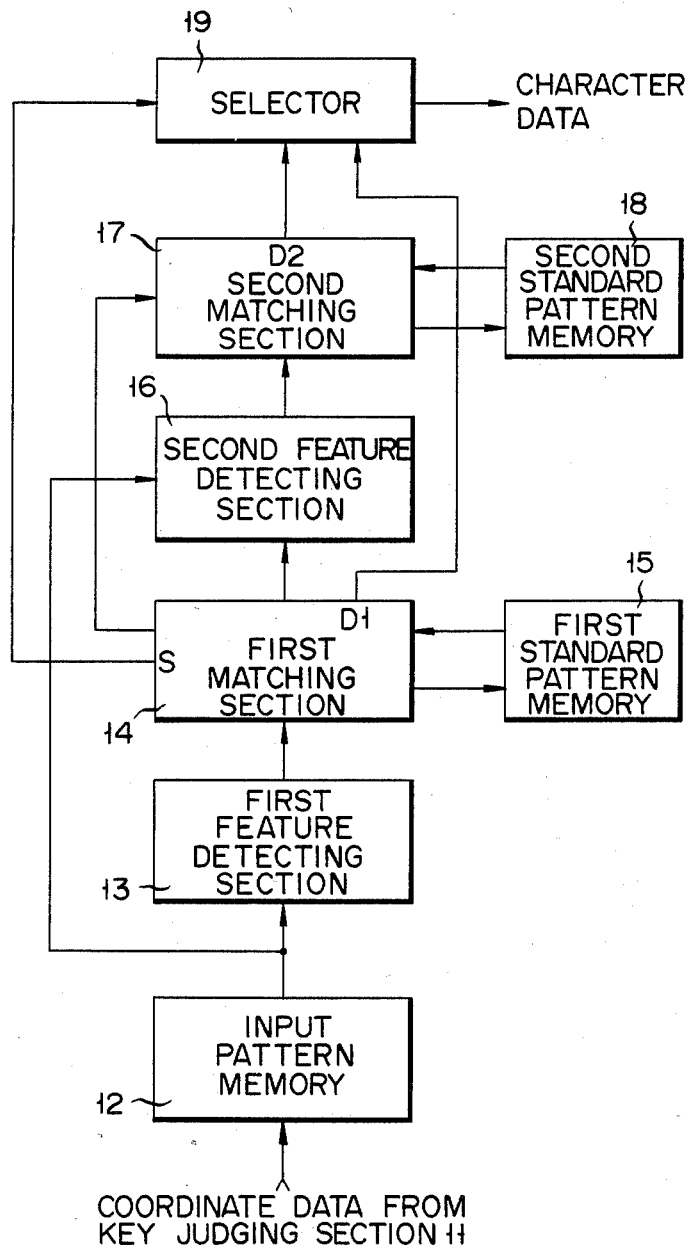
FIG. 3 is a block diagram illustrating details of the character recognition section 10 used in the embodiment of FIG. 1.

The recognizing operation of the input characters, which is performed in the character recognition section 10, may now be described in greater detail, with reference to FIG. 3 to FIG. 14. FIG. 3 is a block diagram illustrating the details of a configuration of the character recognition section 10. The coordinate data output from the key judging section 11 is sent to an input pattern memory 12. The memory 12 stores the coordinate data, stroke by stroke, for each character. The pattern data stored in the input pattern memory 12 is sent to a first feature detecting section 13. Then, the first feature detecting section 13 detects the stroke feature of each stroke of the input character, as a first feature. The first feature detected by the first feature detecting section 13 is sent to a first matching section 14. The first matching section 14, in turn, compares the first feature to standard patterns successively read out from a first standard pattern memory 15. A stroke feature of the standard pattern has been stored in the first standard pattern memory 15. For character recognition, the first matching section 14 compares a stroke feature such as the first feature of the input character, which is detected by the first feature detecting section 13, to the stroke feature of the standard pattern. When, as the result of the comparison, a specific character fails to find its counter part, the result of the matching operation is sent to a second feature detecting section 16 and a second matching section 17. The second feature detecting section 16, when the first matching section 14 fails to recognize the specific character, detects a direction feature as a second feature of the input pattern stored in the input pattern memory 12. The second feature detecting section 16 judges the relative position of a stroke, in relation to other strokes of the input character, using the starting and ending points of each stroke. In a character of one stroke, its feature is detected on the basis of the distance between the starting and ending points. In a character of two or more strokes, its feature is detected on the basis of the distances between the starting points and ending points. The feature detected in then sent to the second matching section 17. For character recognition, the second matching section 17 successively compares the data from the second feature detecting section 16 and the first matching section 14 to a standard pattern having been pre-stored in a second standard pattern memory 18. The character data D1 of the character recognized by the first matching section 14 and the character data D2 of the character recognized by the second matching section 17 are sent to a selector 19. The selector 19 responds to a select signal S output from the first matching section 14 to select either of the character data D1 and D2 input thereto. The first matching section 14 produces such a select signal S as to select the character data D1 from the first matching section 14 when a specific character is recognized, and to select the character data D2 from the second matching section 17 when the specific character is not recognized. The character data D1 or D2 selected by the selector 19 is stored in the display register (not shown) within the memory section 30, under control of the control section 20. The data is further sent to the display section 2, where it is visualized.

With such an arrangement, let us now assume that an operator traces or depicts a desired character with the finger on the finger actuation section 4 with a 5×6 matrix array, when the calculator is in the handwriting mode. In such a case, in response to the key actuation, the key judging section 11 produces coordinate data, which in turn is loaded into the input pattern memory 12 in the character recognition section 10.

Let us now consider the case wherein a character "D", for example, is input by finger tracing with two strokes, such as ∩. In tracing the first stroke of the character "D", the keys in the finger actuation section 4 are actuated in the order shown in FIG. 4(a). In tracing the second stroke, the keys are actuated in the order shown in FIG. 4(b). Through a sequence of the key actuations, the key judging section 11 produces the coordinate data shown in FIG. 5. In the first stroke shown in FIG. 4(a), for example, the coordinate data produced is "2,1" for actuation of the key ①; "2,2", for key ② depression; and "1,2", for key ③ operation. These items of coordinate data are successively produced from the key judging section 11. The coordinate data, along with the final stroke end data for each stroke and the character end data for the final stroke, is written into the input pattern memory 12, for every stroke. The stroke end data is used when the key judging section 11 judges that the succession of the key actuations has been interrupted. The character end data is used in making the judgement wherein, when the next key operation is absent for a predetermined period, the inputting of the character ends. After the character end data is written into the input pattern memory 12, the first feature detecting section 13 performs the detection of the stroke feature as the first feature of the input pattern. The stroke feature detected by the first feature detecting section 13 relates to the direction of the strokes of the input character and the time sequence of the strokes. The directions of the stroke are illustrated in FIG. 6. As shown, on the X-axis, "2" is assigned to the right direction, and "1" to the left direction. On the Y-axis, "1" is assigned to the up direction and "2" to the down direction. When the sum of the differences of the coordinate data between the keys operated exceeds 2 or −2, it is considered the stroke feature, and is written into the memory in the first feature detecting section 13. In other words, when three or more keys are actuated in a fixed direction, it is considered the stroke feature. In this case, when a character is further input by handwriting in the same direction and the sum is above 2 or −2, such input indicates the same feature as the previous feature and therefore is ignored. Patterns of the stroke features of the input pattern of the "D" in FIG. 5 are shown in FIGS. 7(a) and 7(b), respectively. In the case of the "D", the stroke feature of the first stroke on the X-axis is not detected, since it has no extension in the width direction. The second stroke advances in the "2" direction and changes the direction to the "1" direction. The stroke feature on the X-axis is as shown in FIG. 7(a). On the Y-axis, the first stroke advances in the "2" direction, and the second stroke goes in the same direction. The Y-axis have the feature pattern shown in FIG. 7(b). However, there is also a case wherein one specific character cannot be specified on the basis of the recognition results.

The input pattern held in the input pattern memory 12 is sent to the second feature detecting section 16. The second feature detecting section 16 then detects the direction feature as the second feature. As described above, the second feature of a character with one stroke is detected on the basis of the distance between the starting and ending points. A character with two or more strokes is detected on the basis of distance between the starting and ending points. FIG. 8(a) shows a pattern of the direction feature of the input pattern of the letter "D". In the letter "D", the first and second strokes have the same starting and ending points. The starting and ending points of the direction feature on the X-axis are "0" and "0", respectively. Those on the Y-axis are also "0" and "0", respectively. In another example, e.g., in the case of the letter "P", the stroke feature is exactly the same as that of the letter "D". The direction feature is as shown in FIG. 8(b). In the case of the letter "P", the first and second strokes have the same starting points, but different ending points. As shown, the ending point of the second stroke is distanced by "1" from the ending point of the first stroke only in the direction of the Y-axis. Therefore, the directional feature of the X-axis direction is "0" and "0", and that of the Y-axis is "0" and "1".

Figure 9:
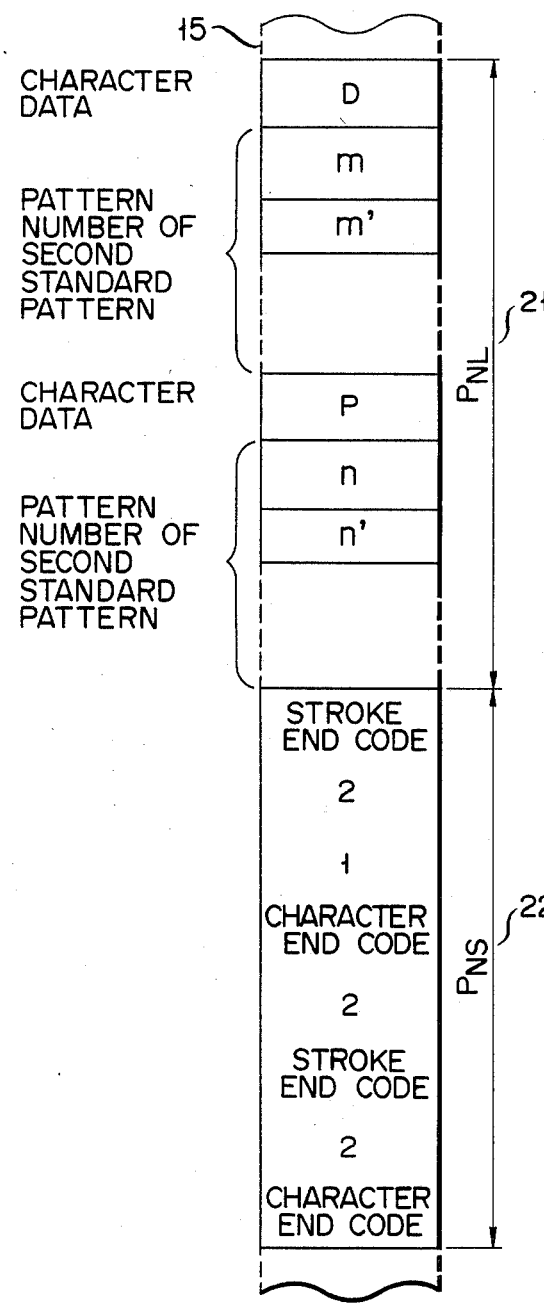
FIG. 9 shows the stored state of a standard pattern in the first standard pattern memory 15 shown in FIG. 3.
Figure 10:
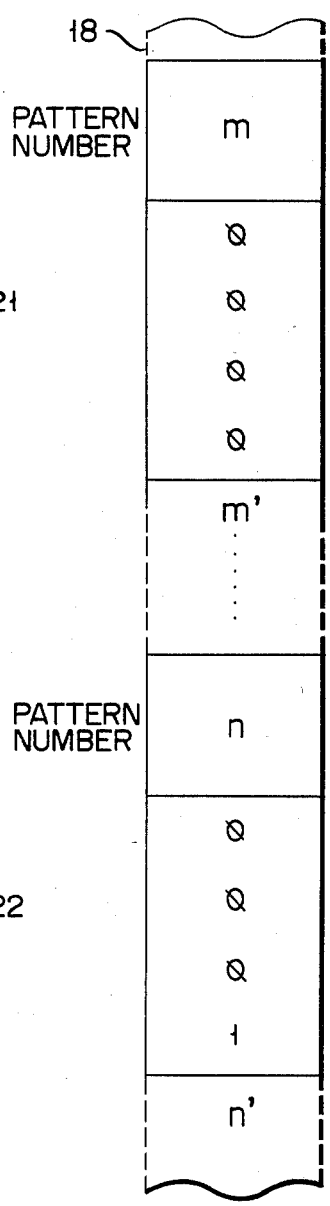
FIG. 10 shows the stored state of a standard pattern in the second standard pattern memory 18 shown in FIG. 3.

The first feature detected by the first feature detecting section 13 is transferred to the first matching section 14. In the first matching section 14, the first feature is compared to the first standard pattern stored in the first standad pattern memory 15. The first standard pattern memory 15 has pre-stored the first standard pattern of each character, as shown in FIG. 9. FIG. 9 illustrates examples of patterns of the letters "D" and "P". The first standard pattern consists of a label field 21 and a feature data field 22. The label field 21 contains "D" and "P" letter data and second standard pattern numbers, such as m, m', . . . , n, n', . . . . The feature data field 22 stores the stroke feature patterns shown in FIGS. 7(a) and 7(b), corresponding to the label field 21. A plurality of the second standard pattern numbers, such as m, m', . . . , are stored for one character in the example of FIG. 9. The reason for this is that the character input by the handwriting may slightly be deformed during the handwriting operation, and even in such case, the recognition of such a deformed character is enabled. Specifically, the plurality of the second standard pattern numbers are made to correspond to one character data, for coping with such deformation of the character. The second standard pattern stored in the second standard pattern memory 18 is selectively specified by the second standard pattern numbers. In the case of letters in which the stroke features are exactly the same, e.g., in the case of the letters "D" and "P", as shown in FIG. 9, a plurality of letter data and the second standard pattern number corresponding to each item of letter data are stored in the label field 21. The first matching section 14 compares the stroke feature, as a first feature of the input pattern output from the first feature detecting section 13 to the stroke feature of the first standard pattern derived from the first standard pattern memory 15 and stored in the feature data field 22. As a result of the comparison, if a character with a stroke feature the same as the first feature is detected as being a specific character, the selector 19 is connected to the first matching section 14 by a select signal S, such as binary signal "1" or "0". Then, the character data D1 output from the first matching section 14 is selected by the selector 19, and is sent to the display section 2 for display. When failing to recognize the character corresponding to the first feature as the specific character, the first matching section 14 sends the select signal S to the selector 19 which in turn connects to the second matching section 17. Further, the first matching section 14 sends an operation command to the second feature detecting section 16 and, at the same time, sends the data of the second standard pattern selected from the first standard pattern memory 15 to the second matching section 17. The second feature detecting section 16, as already mentioned, responds to a command issued from the first matching section 14, extracts the direction feature of the input pattern, and sends said feature to the second matching section 17. The second matching section 17 compares the second standard pattern read out from the second standard pattern memory 18 to the direction feature serving as the second feature derived from the second feature detecting section 16. In this regard, the second standard pattern number in the label field 21 delivered from the first matching section 14 is used for reading out the second standard pattern from the second standard pattern memory 18. And the second standard pattern read out corresponds to the second standard pattern number in the label field 21. Stored in the second standard pattern memory 18 are the second standard pattern number in the first standard pattern, such as m, m′, . . . , n, n′, . . . , as shown in FIG. 9, and the direction feature referred to FIGS. 8(a) and 8(b). The second standard pattern which is the same as the second feature is selected through matching processing by the second matching section 17. In turn, that item of character data which corresponds to the pattern number of the second pattern, such as character data D2 is applied from the second matching section 17 to the selector 19. Character data D2 is selected by the select signal S and sent to the control section 20 for display. When the second matching section 17 fails to have the same second standard pattern as the second feature, the calculator judges this situation as one in which the input character cannot be recognized, and performs a reject processing operation.

The operation of the first feature detecting section 13, the first matching section 14, the second feature detecting section 16 and the second matching section 17 may now be described in detail, with reference to the flowcharts. Firstly, the flowcharts shown in FIGS. 11(a) to 11(b) will be used in explaining the operation of the first feature detecting section 13. Table 1, as shown below, tabulates variable symbols and their contents, which are used in the first feature extracting flow. These variables are stored as predetermined digits in a plurality of registers (not shown) in the first feature detecting section 13.

TABLE 1

| First Feature Extraction Flow Variable | |
|---|---|
| $C_L$: | Register for storing a numerical value code representing the first feature in the X direction. |
| $C_M$: | Register for storing a numerical value code representing the first feature in the Y direction. |
| L: | Counter for counting the number of the first feature in the X direction. |
| M: | Counter for counting the value of the first feature in the Y direction. |
| $P_X$: | Register for accumulating difference values on the X-ordinate, between keys, when the stroke advances to the right ($D_N^X > 0$). |
| $P_Y$: | Register for accumulating difference values on the Y-ordinate, between keys, when the stroke advances downwardly ($D_N^Y > 0$). |
| $J_X$: | Register for accumulating difference values on the X-ordinate, between keys, when the stroke advances to the left ($D_N^X < 0$). |
| $J_Y$: | Register for storing difference values on the Y-ordinates, between keys, when the stroke advances upwardly ($D_N^Y < 0$). |
| $K_N$: | Coordinate data of the key Nthly depressed (containing the stroke end data and the character end data). |
| N: | Key counter |
| C: | Register for temporarily holding the first feature. |
| $K_N^X$: | X-ordinate of the key Nthly depressed. |
| $K_N^Y$: | Y-ordinate of the key Nthly depressed. |
| $D_N^X$: | Register for storing the X-ordinate difference between the Nth key and (N-1)th key. |
| $D_N^Y$: | Register for storing the Y-ordinate difference between the Nth key and the (N-1)th key. |

Figure 11A:
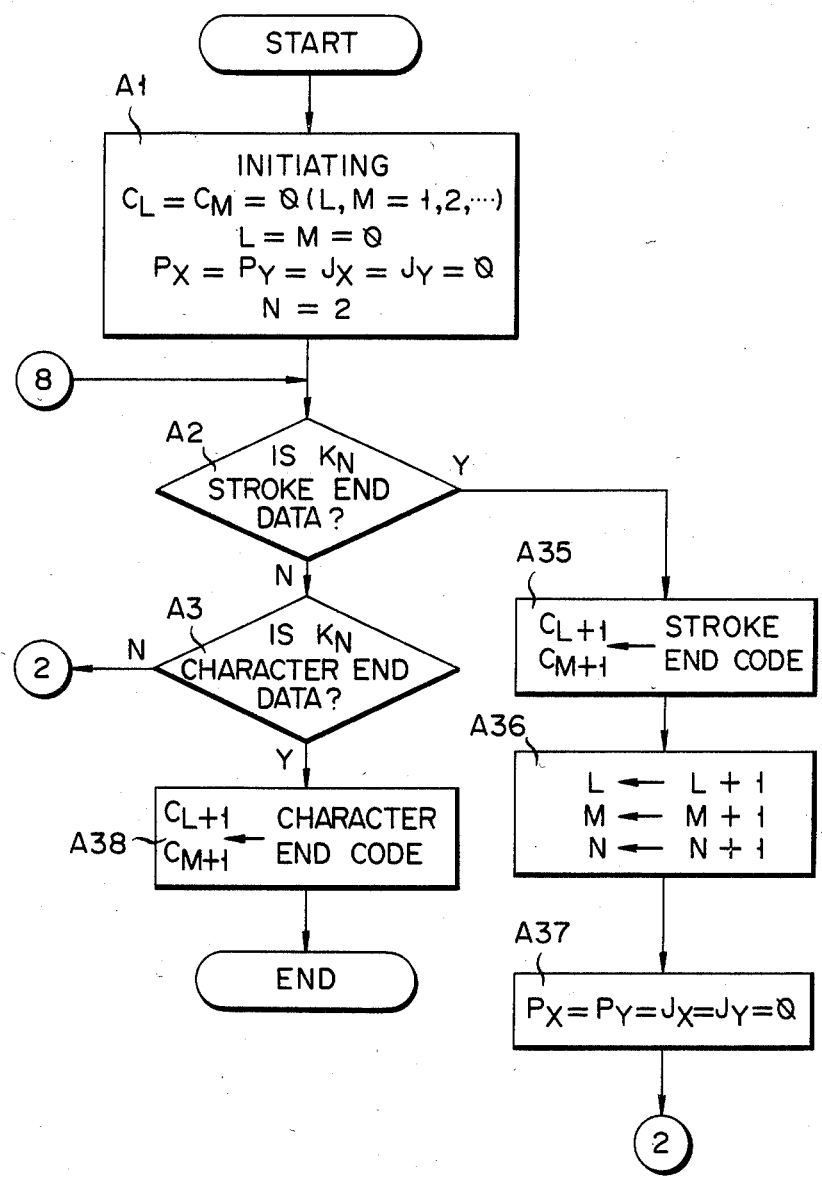
FIGS. 11(a) through 11(c) collectively show a flowchart illustrating the operation of the first feature detecting section 13 shown in FIG. 3.
Figure 11B:
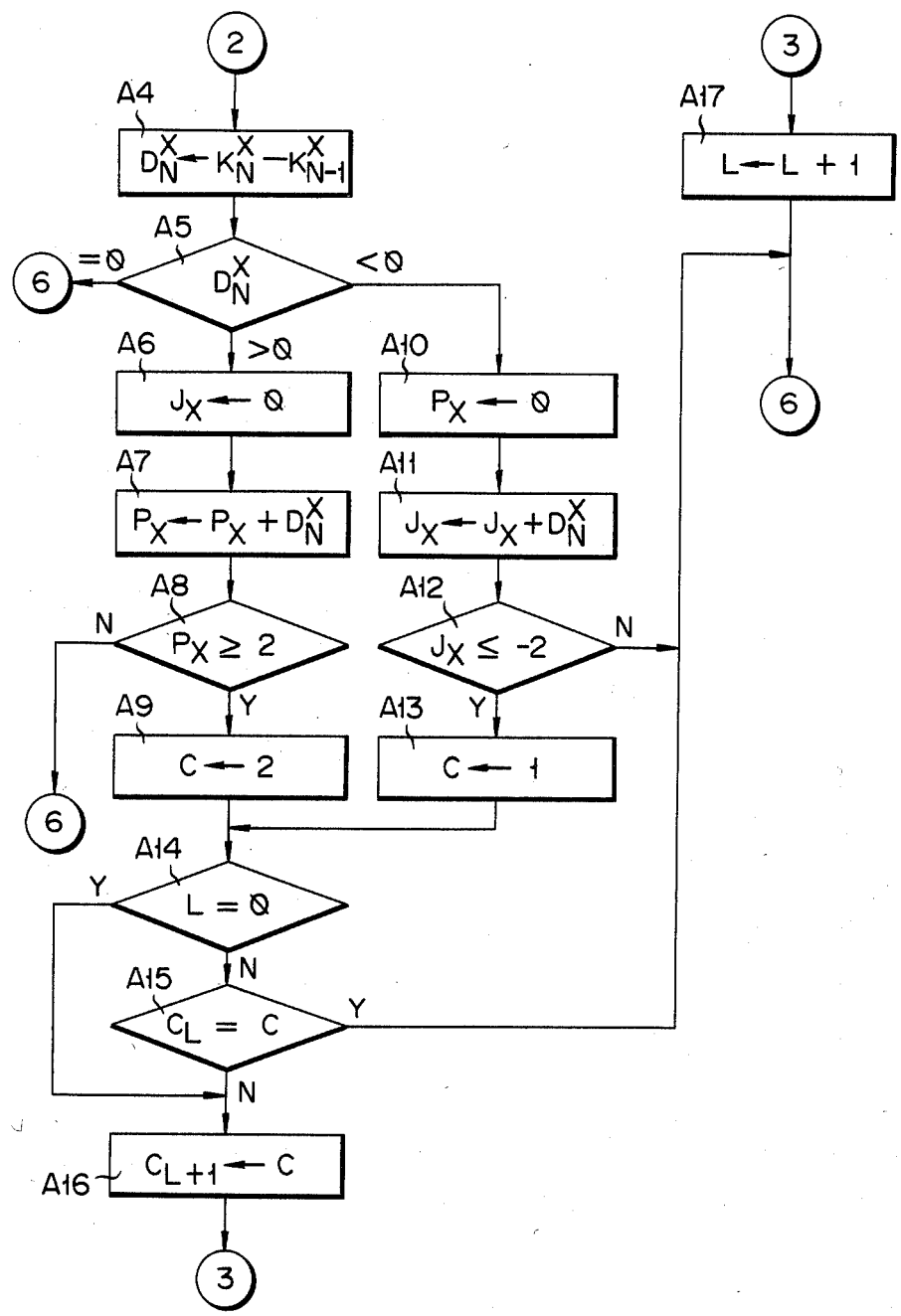

When the first feature detecting section 13 starts up, it first initializes various registers and counters, as shown in step A1 of FIG. 11(a). Specifically, it sets the registers $C_L$, $C_M$ for storing the numerical value codes representing features of the X and Y-directions, counters L, M used for counting the number of the first features of the X and Y-directions, and registers $P_X$, $P_Y$, $J_X$, $J_Y$ used for accumulating the coordinate data difference between the keys in the direction of the stroke advancing to "0"; and sets a key counter N to "2". Then, a step A2 is executed in which it is judged whether the coordinate data $K_N$ of the key Nthly depressed is the stroke end data or not. If it is not the stroke end data, a step A3 is performed in which it is judged whether the coordinate data is the character end data or not. If it not the character end data in the step A3, a step A4 shown in FIG. 11(b) is performed. In this step, the X-ordinate $K_{N-1}^X$ of the (N−1)thly depressed key, that is, the previously depressed key, is subtracted from the X-ordinate $K_N^X$ of the Nthly depressed key. The results of the subtraction are loaded into the X-ordinate register $D_N^X$. Then, in step A5, it is judged whether $D_N^X$ is equal to, larger or smaller than "0". If it is larger than "0", it indicates that the stroke goes to the right. Under such conditions, "0" is loaded into register $J_X$, as shown in a step A6 and the contents of the registers $P_X$, $D_N^X$ are added. In step A7, the sum is loaded into register $P_X$. In step A8, $P_X$ either conforms to the relationship "$P_X \geq 2$" or does not. If it is above "2", the processing advances to step A9, the load "2" indicating the right direction is written into register C, which temporarily stores the first feature. In the step A5, if $D_N^X$ is smaller than "0", the stroke advances to the left. At this time, the processing goes to a step A10. In this step, "0" is loaded into the register $P_X$. And in a step A11, $D_N^X$ is added to $J_X$. In the next step A12, it is judged whether $J_X$ is "$J_X \geq -2$" or not. If it is below "−2", the processing proceeds to a step A13 to load "1" indicating the left direction into the region C. After the processing of the steps A9 or A13 finishes, it goes to a step A14. In this step, the counter L for counting the first feature of the X-direction is either "0" or is not. If it is not "0", it proceeds to step A15. In this step, it is judged whether $C_L$ and C are equal to each other or not. If "$C_L \neq C$", i.e., if the stroke direction changes; or, in step A14, if "L=0", i.e., if the feature extraction is made, the processing goes to step A16. In this step, C is loaded into the $C_L+1$ digit of register C, as shown in FIG. 7(a). In step A17, the contents of the counter L is incremented by one (+1). Steps A4–A17 are for extraction processing of the first feature of the X-direction of the stroke data. If, in step A15, the processing judges that "$C_L=C$"; in step A8, it is judged that $P_X$ is smaller than "2"; in step A5 it is judged that "$D_N{}^X=0$"; in step A12, that $J_X$ is larger than "−2"; and, when step A17 ends, the processing advances to the first feature extraction processing performed in step A20 and the subsequent ones shown in FIG. 11(c).

Figure 11C:
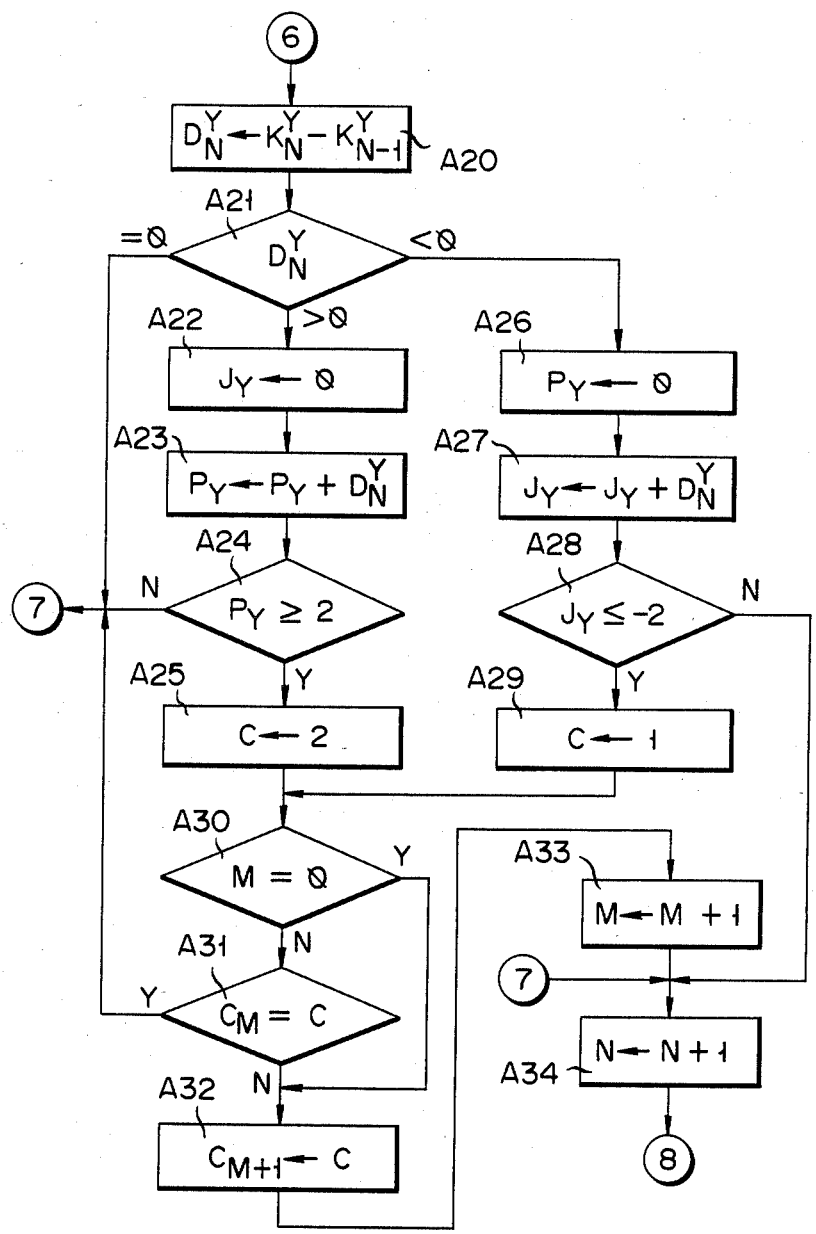

In the step A20 shown in FIG. 11(c), the Y-coordinate $K_{N-1}{}^Y$ of the first depressed key is subtracted from the Y-ordinate $K_N{}^Y$ of the key Nthly depressed, and the results of the subtraction are loaded into the register $D_N{}^Y$ of the Y-coordinate. Then, in step A21, it is judged that the contents of register $D_N{}^Y$ are equal to, larger or smaller than "0". If it is larger than "0", the stroke goes in the downward direction. Next, the processing goes to step A22. In this step, "0" is loaded into register $J_Y$. Then, in step A23, the contents of register $D_N{}^Y$ are added to the contents of register $P_Y$. The processing then advances to step A24, in which it is judged that register $P_Y$ either conforms to the relationship "$P_Y \geq 2$" or does not. If register $P_Y$ is above "2", "2" indicates that the downward direction is loaded into register C, as shown in step A25. In step A21, when the contents of register $D_N{}^Y$ are smaller than "0", the stroke goes upward. In this case, the processor advances to step A26, to load "0" into register $P_Y$. Then, in step A27, the contents of register $D_N{}^Y$ are added to the contents of the register $J_Y$. Then, step A28 is executed, to judge whether the contents of register $J_Y$ conform to the relationship "$J_Y \leq -2$", or not. If they are below "−2"; in step A29, "1" indicates that the upward direction is loaded into register C. Step A30 follows the execution of step A25 or A29. In step A30, it is judged whether or not the contents of the counter M for counting the first feature of the Y direction are "0". If they are not "0", step A31 is executed, to judge whether the contents of registers $C_M$ and C are equal or not. In step A31, if "$C_M \neq C$", or, in step A30, if "$M=0$", the next step A32 is executed to load the contents of register C, which are written into the $C_{M+1}$ digit of the feature register $C_M$, as shown in FIG. 7(b). In step A33, the contents of the counter M are incremented by one. If, in step A24 the contents of register $P_Y$ are smaller than "2"; in step A21, it is judged that "$D_N{}^Y=0$"; in step A31 it is judged that "$C_M=C$", and when the processing of step A33 is finished, the contents of the key counter N are incremented by one in step A34; and, then, the processor returns to the step A2 shown in FIG. 11(a). The sequence of the above operations are repeated until the stroke end data is detected. When, in step A2, the stroke end data is detected, the processing flows to step A35. In step A35, the stroke end data is loaded into the digits $C_{L+1}$, $C_{M+1}$ of registers $C_L$ and $C_M$, as shown in FIGS. 7(a) and (b). In step A36, the counters L, M for counting the number of the first features and the key counter N are incremented by one (+1). In step A37, registers $P_X$, $P_Y$, $J_X$ and $J_Y$ are cleared to "0" and the processing returns to step A4. In this way, the processing of each stroke is completed. Then, when the character end data is detected in step A3, the processor advances to step A38 to load the character end code into the digits $C_{L+1}$, of the feature registers $C_L$, $C_M$, as shown in FIGS. 7(a) and 7(b). At this point, the first feature extraction processing operation ends.

Figure 12:
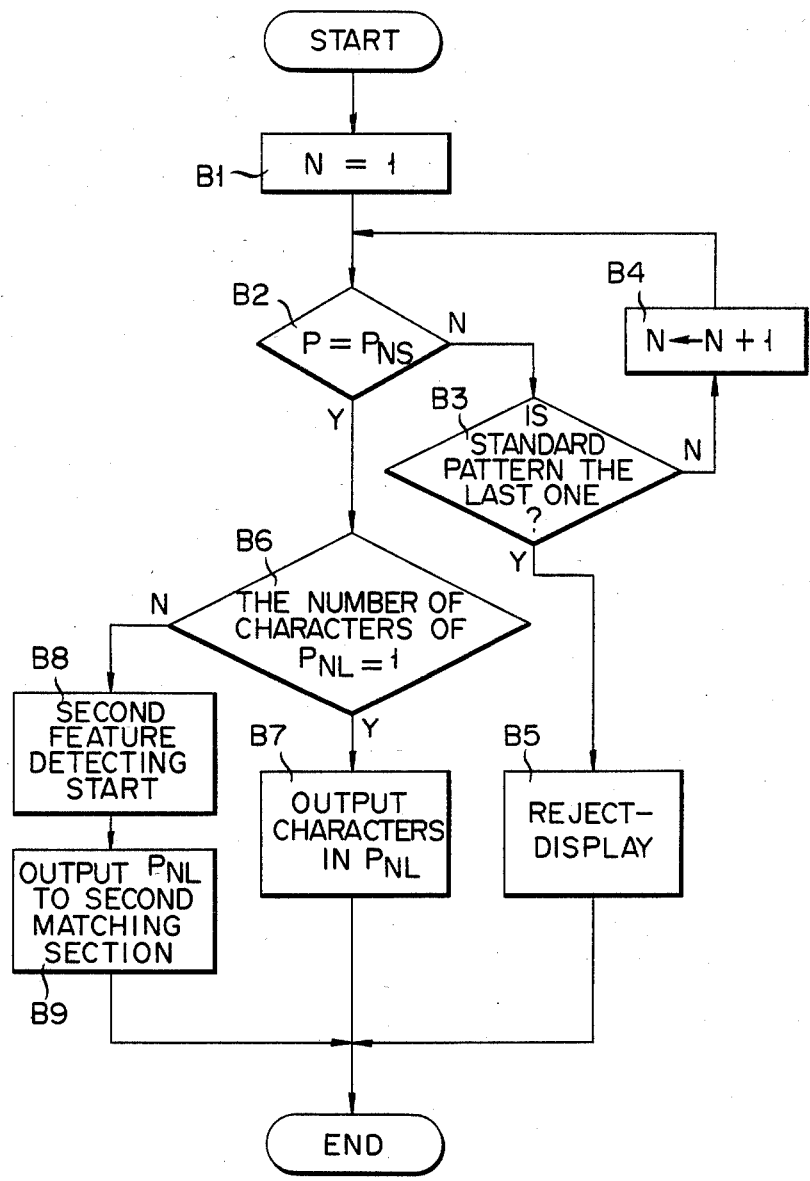
FIG. 12 is a flowchart illustrating the operation of the first matching section 14 shown in FIG. 3.

The operation of the first matching section 14 may be described via the flowchart of FIG. 12, Table 2 illustrates variable symbols and their contents. These variables are loaded into predetermined digits of a plurality of registers (not shown) in the first matching section 14.

TABLE 2

First Matching Flow Variable

| | |
|---|---|
| N: | Counter of the first standard pattern. |
| $P_{NS}$: | Feature data section of the Nth first standard pattern. |
| $P_{NL}$: | Label section of the Nth first standard pattern. |
| P: | First feature pattern of the input character. |

The first matching section 14 sets "1" into the counter of the first standard pattern internally provided, as shown in step B1 in FIG. 12. Then, the processing advances to step B2. In this step, it is judged whether the feature data section of the Nth first standard pattern read out from the first standard pattern memory 15 shown in FIG. 9, is equal to the first feature pattern of the input character or not. If these are not equal to each other, the processing advances to step B3, to check whether or not the specified address for the first standard pattern memory 15 reaches the final address. If it does not yet reach the final address, the processing advances to step B4. In step B4, the contents of the counter N are incremented by one and the counter returns to step B2. In this way, the first standard pattern is sequentially read out from the first standard pattern memory 15, to compare its data feature section $P_{NS}$ to the first feature pattern of the input pattern and find the coincidence therebetween. If the coincidence is found between any of those items of data, the processing advances from step B3 to step B5 and displays a reject. In step B2, if there is a coincidence between the first feature pattern P of the input character and the first feature pattern, the processing goes to step B6. In this step, it is judged whether the number of the characters (the number of the character data) in the label field $P_{NL}$ in the first standard pattern is single or not. If the number of the characters is one, the character data is output as data D1 in step B7, and is sent to the selector 19, as described with reference to FIG. 3. At this time, the first matching section 14 issues the select signal S which, in turn, connects the selector 19 to the first matching section 14. In step B6, if it is judged that the number of characters in the label field $P_{NL}$ in the first standard pattern is plural, the program execution shifts to step B8, in which an operation command is applied to the second feature detecting section 16 shown in FIG. 3, to cause the extraction of the second feature to start. Further, in step B9, the data stored in the label field $P_{NL}$ in the first standard pattern is output to the second matching section 17. At this time, the first matching section 14 issues the select signal S to connect the selector 19 to the second matching section 17. At this point, the matching operation of the first matching section 14 ends.

Figure 13A:
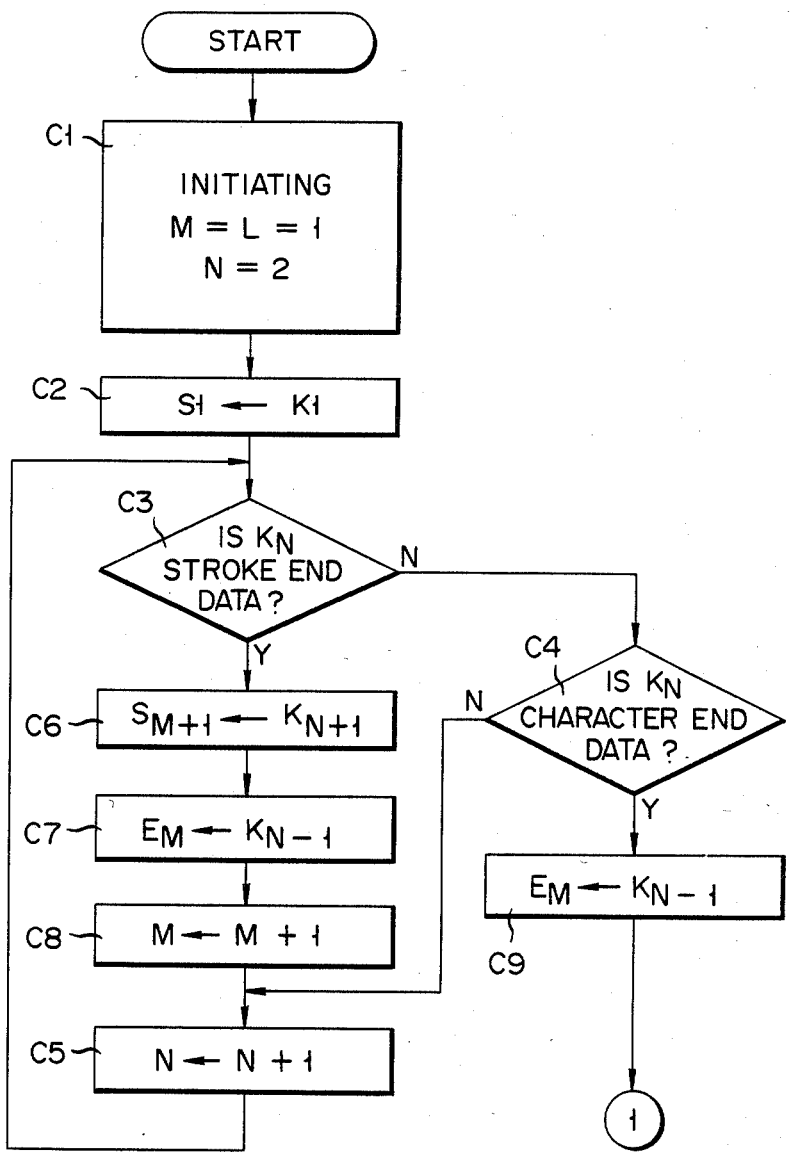
FIGS. 13(a) and 13(b) show a flowchart illustrating the operation of the second feature detecting section 16 shown in FIG. 3.
Figure 13B:
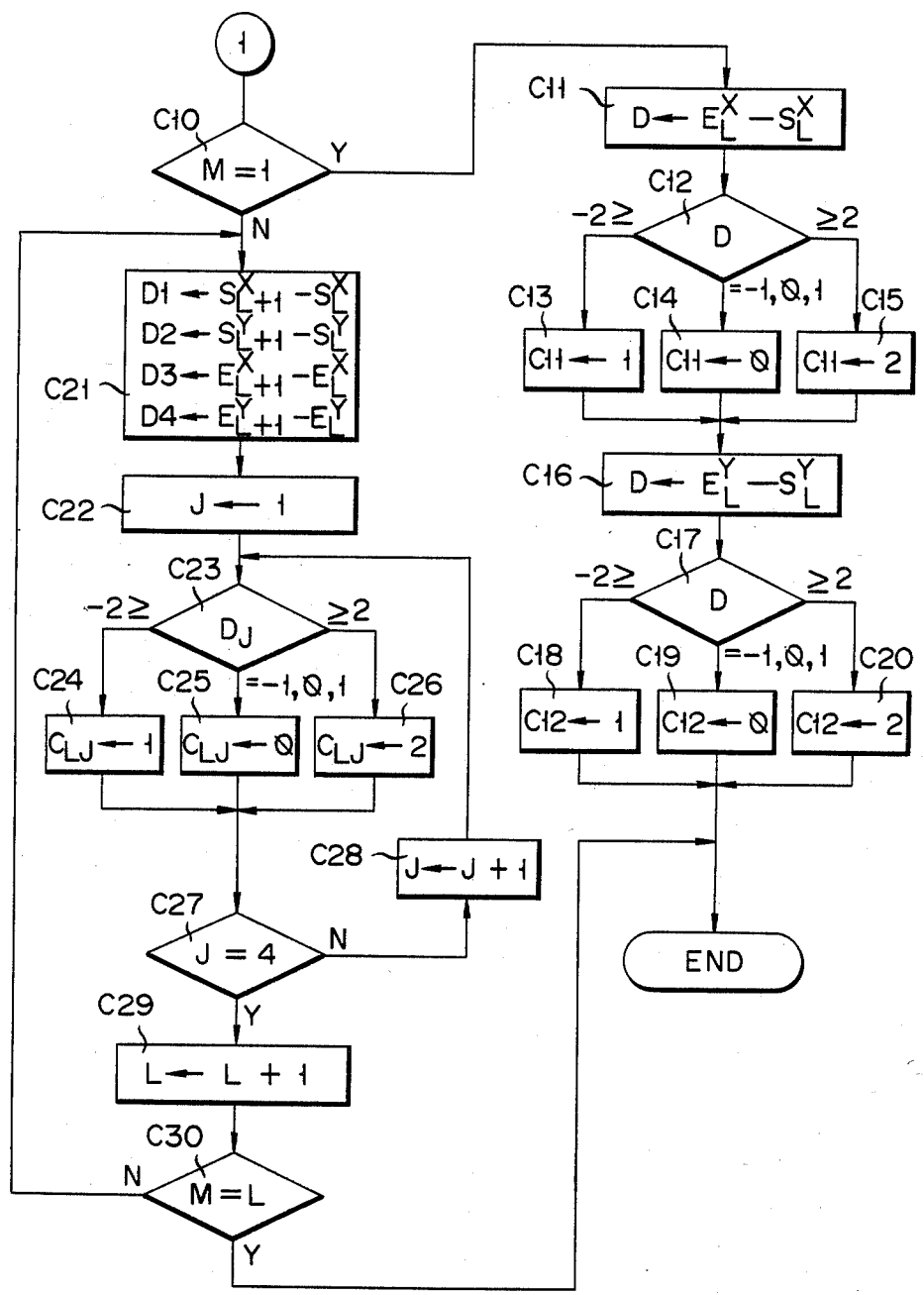

The operation of the second feature detecting section 16 may be described via the flowchart of FIGS. 13(a) & (b). Table 3 shows variable symbols used in the second feature extracting flow and their contents. Predetermined digits in a plurality of registers (not shown) are formed in the second feature detecting section 16.

TABLE 3

Second Feature Extracting Flow Variables

| | |
|---|---|
| $C_{LJ}$ One stroke: | Register for storing the second features of the X-direction (J = 1) and |

TABLE 3-continued

Second Feature Extracting Flow Variables

| | | |
|---|---|---|
| Two or more strokes: | | Y-direction (J = 2) at the standing and ending points. *Register for storing the second feature of the X-direction between the starting points of the L stroke and the L + 1 stroke, when J = 1. *Register for storing the second feature of the Y-direction between the starting points of the L stroke and the L + 1 stroke, when J = 2. *Register for storing the second feature of the X-direction between the starting points of the L stroke and the L + 1 stroke, when J = 3. *Register for storing the second feature of the X-direction between the starting points of the L stroke and the L + 1 stroke, when J = 4. |
| L: | Stroke counter: | Counter for counting the number of calculations of the first features. |
| J: | | Counter for discriminating the starting and ending points, and the X and Y-directions (See the register $C_{LJ}$). |
| M: | | Counter |
| $S_M$ $S_L$ | } : | Register for storing the coordinate data at the starting point of the Mth or Lth stroke. |
| $E_M$ $E_L$ | } : | Register for storing the coordinate data at the starting point of the Mth or Lth stroke. |
| $S_L^X$: | | X-coordinate at the starting point of the Lth stroke. |
| $S_L^Y$: | | Y-coordinate at the starting point of the Lth stroke. |
| $E_L^X$: | | X-coordinate at the ending point of the Lth stroke. |
| $E_L^Y$: | | YX-coordinate at the ending point of the Lth stroke. |
| $D_J$: | | Register for temporarily storing the Jth difference. For one stroke, a difference between the X and Y-coordinates at each of the starting and ending points (D). |
| $K_N$: | | Coordinate data of the key Nthly depressed (including stroke end data and character end data). |
| N: | | Key counter (for counting the order of key actuations). |

The second feature detecting section 16 responds to a command from the first matching section 14, to start the operation for extracting the feature serving as the second feature. In the step C1 shown in FIG. 13(a), counters L and M are set to "1", and counter N is set to "2". In the next step C2, the coordinate data for the first key actuation is read out from the input pattern stored in the input pattern memory 12 and is written into the register S1. In the step C3 to follow, it is judged whether the coordinate data $K_N$ of the key Nthly depressed is the stroke end data or not. It it is not the stroke end data, the processing proceeds to step C4, to judge whether it is the character end data or not. In step C4, if it is not the character end data, the processing proceeds to step C5, to increment by one the contents of the key counter N, and returns to step C3. Subsequently, a similar operation is repeated, and, if, in step C3, the stroke end data is detected, the processing proceeds to step C6. The coordinate data $K_{N+1}$ at the starting point of the next stroke is loaded into register $S_{M+1}$. The processing goes to step C7, to load the coordinate data $K_{N-1}$ at the end point of the stroke into the register $E_M$. Then, in step C8, the counter M is incremented by one and proceeds to step C5. After this, in step C3, when it is judged that $K_N$ is not the stroke end data and if, in step C4, $K_N$ is found to be the character end data, the processing proceeds to step C9, to load the coordinate data $K_{N-1}$ for the "N−1"th key actuation. In the next step C10, the processing judges whether the counter M is "1" or not. If the answer is YES, i.e., in the case of one stroke, the processing proceeds to step C11, to subtract the X-coordinate at the start of the first stroke from the X-coordinate $E_L^X$ at the end thereof. Then, the processing writes the results of the subtraction into register D. Next, in step C12, it is judged whether the contents of the register D are below or above "−2", or, are "−1", 0 or "1". If they are below "−2", "1" is loaded into register C11, which stores the second features of the X-direction at the starting and ending points of the first stroke. If the contents are "1, 0, 1"; in step C14, "0" is loaded into register C11. If they are above "2"; in step C15, "2" is loaded into register C11. Then, the processing advances to step C16 to subtract the Y-ordinate at the starting point $S_L^Y$ of the first stroke from the Y-coordinate at the ending point $E_L^Y$, and to load the results into register D. In step C17, it is judged whether the contents of the register are below or above "−2"; or, are "−1". If they are below "−2"; in step C18, "1" is loaded into register C12. If they are "−1, 0 or 1", "0" is loaded into register C12 in step C19. If they are above "2"; in step C20, "2" is loaded into register C12. Thus, in the case of a letter of one stroke, the distance between the starting and ending points is extracted as the second feature. The second feature of the Y-coordinate is loaded into register C11. The second feature of the X-coordinate is loaded into register C12. At this point, the extraction processing of the second feature of a letter of one stroke ends.

When, in step C10, it is judged that the contents of the counter M are not "1", i.e., that the letter in question has one or two strokes, the processing goes to step C21, to subtract the X-coordinate $S_L^X$ at the starting point of the first stroke from the X-coordinate $S_{L-1}^X$ at the starting point of the second stroke, which operation is represented as "$S_{L-1}^X - S_L^X$", and to load the results of the subtraction into register D1. Step C21 executes the calculation of the formula "D2←$S_{L-1}^Y - S_L^Y$", "D3← $E_{L+1}^X - E_L^X$" and "D4←$E_{L+1}^Y - E_L^Y$". In step C21, the processor calculates the distances between the starting points and between the ending points of strokes in the X and Y coordinates, and loads them into the registers D1–D4. Then, the processor advances to step C22, to set "1" in the counter J. In the next step C23, the processing judges whether the contents of register $D_J$ are below or above "−2"; or, are "−1, 0, or 1". When they are below "−2"; in step C24 "1" is loaded into register $C_{LJ}$. If they are "−1, 0 or 1"; in step C25, "0" is loaded into register $C_{LJ}$. If they are above "2"; in step C26, "2" is loaded into the same register. In the subsequent step C27, it is judged whether the contents of the counter J reach "4" or not. If the contents do not reach "4"; in step C28, the processing increments the counter J by one, and returns to step C23. This processing continues until the contents of the counter J reach "4". Judging the contents of the registers D1–D4, the second feature data is loaded into register $C_{LJ}$, as shown in FIGS. 8(a) and 8(b). Then, when the counter J has the count "4" and the calculation of the four second features of the (L+1)th and Lth strokes is completed through processing steps C23 to C26; in step S27, it is judged that J=4. In the next step C29 the contents of the counter L are incremented by one; and, in step C29, it is judged whether or not the contents of counter L are equal to those of counter M. If the contents of counter L do not reach those of counter M, the processing returns to step C21. This processing is repeated until the contents of these counters L, M are equal to each other. As both counters have the same contents, the feature extracting processing of the character with two or more strokes ends.

The operation of the second matching section 17 may now be described with reference to FIG. 14. Table 4 shows the variable symbols used in a second matching flow and their contents. These variables are stored in a plurality of registers (not shown) in the second matching section 17.

TABLE 4

Second Matching Flow Variables

| | |
|---|---|
| M: | Counter for the character data in the label field of the first standard pattern. |
| N: | Counter for the pattern number of the second standard pattern in one character of the label field of the first standard pattern. |
| $A_{MN}$: | Pattern number of the Nth second standard pattern of the Mth character in the first standard pattern. |
| $P(A_{MN})$: | Second standard pattern of pattern number $A_{MN}$. |
| $C_M$: | Mth character data in the label field of the first standard pattern. |
| P: | Second feature pattern of the input character. |

Figure 14:
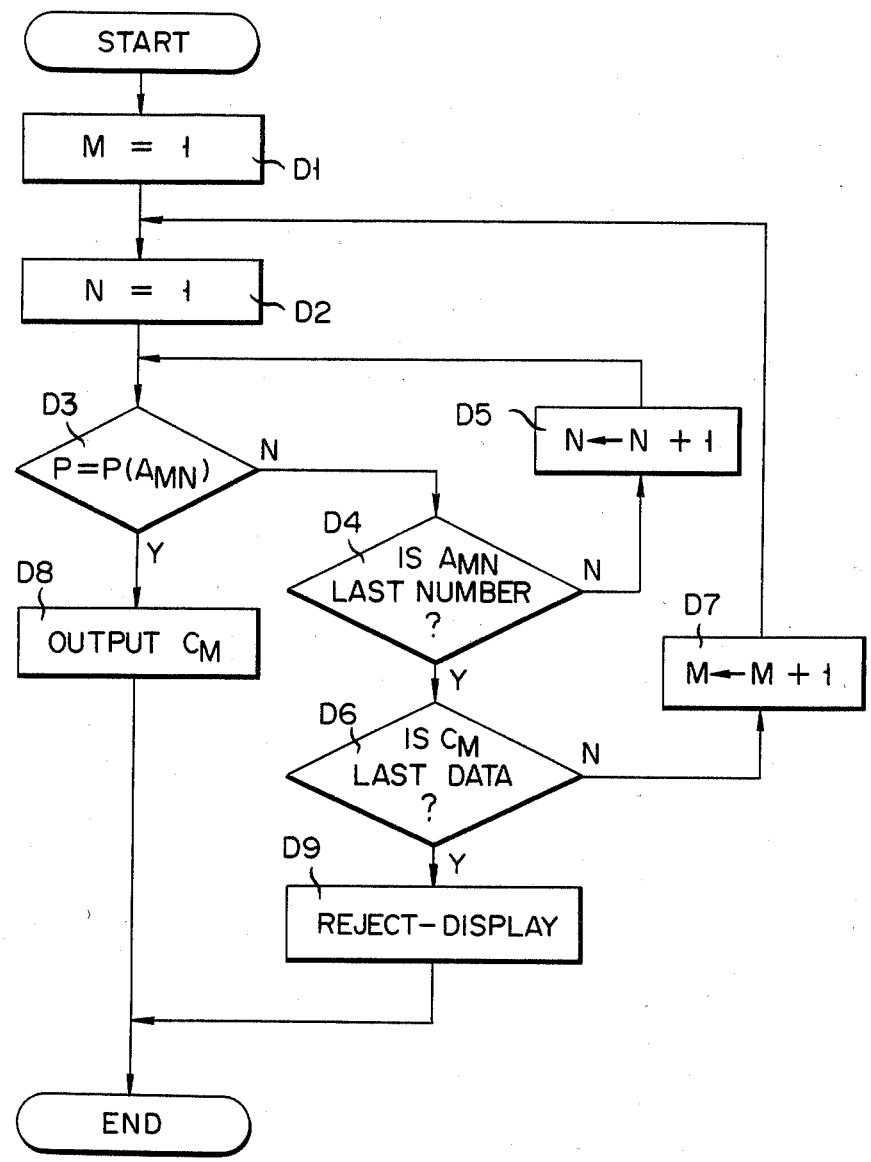
FIG. 14 is a flowchart illustrating the operation of the second matching section 17 shown in FIG. 3.

The second matching section 17 first sets "1" into counter M, specifying the character data in the label field of the first standard pattern, as shown in step D1 of FIG. 14. In step D2, "1" is set into counter N specifying the pattern number of the second standard pattern in the label field of the first standard pattern. The processing then proceeds to step D3, to check whether the second feature to pattern P of the input character sent from the second feature detecting section 16 coincides with the second standard pattern of the pattern number $A_{MN}$ read out from the second standard pattern memory 18. If these are not coincident with each other, the processing proceeds to step D4. In this step, the processing checks whether or not the pattern number of the Nth second standard pattern of the pattern numbers of the second standard patterns corresponding to the Mth character data in the label field of the first standard pattern, reaches the final number. If it does not yet reach the final number; in step D5, the processor increments the contents of the counter N by one and returns to step D3. If, in step D4, it is judged that the pattern number $A_{MN}$ is the final number, the processing advances to step D6, to check whether or not the Mth character data $C_M$ in the label field of the first standard pattern has reached the final data. If it has not yet reached the final data, the processing increments the contents of the counter M by one and returns to step D2. In step D3, if the second feature pattern P coincides with the second standard pattern of the pattern number $A_{MN}$, the processing goes to step D8. In this case, the Mth character data $C_M$ in the label field of the first standard pattern is provided as data D2. This letter data D2 is sent to the display section 2 through the selector 19, the control section 20 and the memory section 30 (FIG. 2). In step D6, if it is judged that the Mth character data $C_M$ in the label field of the first standard pattern is the final data, this situation indicates that the character cannot be recognized. Thus, in step D9, the reject display is made and the processing ends.

What is claimed is:

1. A key-in device, comprising:
a key-in section including a matrix array of operation keys;
input pattern memory means, coupled to said key-in section, for storing an input pattern corresponding to at least one character by receiving coordinate data corresponding to individual operation keys of said key-in section, when the one character is input by a manual stroking operation on said key-in section, and for sequentially storing the coordinate data in such a manner as to divide the input character into its respective strokes;
standard pattern memory means for storing, as a standard pattern, character data of a character to be recognized, first feature data associated with the direction of each stroke of the respective character and second feature data relating to positions of the starting and ending points of each stroke of the respective character;
means coupled to said input pattern memory means, which forms the first feature data associated with the direction of each stroke of the input character and the second feature data relating to positions of the starting and ending points of each stroke of said input character on the basis of the input pattern which is stored in said input pattern memory means; and
means, coupled to said standard pattern memory means and said means for forming the first and second feature data, for recognizing the keyed-in character by detecting the first and second feature data in said standard pattern memory which coincides with the first and second feature data formed by said first and second feature data forming means, and for selecting the corresponding character data stored in said standard pattern memory means.

2. A key-in device according to claim 1, wherein said first feature data of said input pattern and said standard pattern are defined when each stroke of the character takes any one of four directions including up, down, right and left.

3. A key-in device according to claim 1, wherein, when at least three keys are sequentially operated in any one of the four directions, up, down, right or left, in each stroke of the input pattern, said first and second feature data forming means forms the first feature data representative of that direction; and the first feature data stored in said standard pattern memory means are determined by any one of the four directions, up, down, right or left, in which each stroke extends.

4. A key-in device according to claim 1, wherein said means for forming the feature data forms only the first feature data associated with the direction of each stroke of said character, said character recognizing means is operative to compare the first feature data of the input pattern with the first feature data of said standard pattern, so that:
when a character of the standard pattern corresponding to said first feature data coincides with said compared pattern and is composed of a single character, said character recognizing means treats said character as a recognized character; and when said character is composed of a plurality of characters, said character recognizing means issues an instruction to said means for forming said feature data to form the second feature data; and said character recognizing means compares with a second feature of said standard pattern, in response to said instruction, a second feature which is formed by said means for forming said feature data.

5. A key-in device according to claim 1, wherein the first feature data of said input pattern and first feature data of said standard pattern are those data determined by one of the four directions, up, down, left or right, of each stroke of the character;

when the character is comprised of one stroke the second feature data of said input pattern and second feature data of said standard pattern are those data which are determined by one of the four directions in which the ending point of the stroke is located with respect to the starting point thereof; and when the character is comprised of at least two strokes the associated data are those data which are determined according to which of the four directions the starting point of a subsequent stroke is located with respect to the starting point of a preceding stroke and in which of the four directions the ending point of the subsequent stroke is located with respect to the ending point of the preceding stroke.

6. A key-in device according to claim 1, wherein, when at least three keys are relatively actuated in one of four directions, up, down, left or right, that direction is prepared as the first feature data of said input pattern;

when in the case of a one-stroke character the ending point of the character is located in one of the four directions with respect to the starting point thereof by a distance corresponding to at least two keys, that direction is prepared as the second feature data of said input pattern;

when in the case of a character having at least two strokes the starting point of a preceding stroke thereof is located in one of the four directions with respect to the starting point of a preceding stroke thereof by a distance corresponding to at least two keys and the ending point of a subsequent stroke thereof is located in one of the four directions with respect to the ending point of a preceding stroke thereof by a distance corresponding to at least two keys, those respective directions are prepared as the second feature data of said input pattern;

the first feature data of said standard pattern is that data which is determined according to which of the four directions the respective stroke of the character is located;

the second feature data of said standard pattern is that data which is, in the case of the one-stroke character, determined according to which of the four directions the ending point of the stroke thereof is located with respect to the starting point thereof and in the case of the character having at least two strokes the associated items of data are those data which are determined according to which of the four directions the starting point of a subsequent stroke thereof is located with respect to the starting point of the preceding stroke thereof and in which of the four directions the ending point of the subsequent stroke thereof is located with respect to the ending point of the preceding stroke thereof.

7. A key-in device, comprising:

a key-in section having operation keys in a 5×6 matrix;

input pattern memory means, coupled to said key-in section, for storing an input pattern corresponding to at least one character by receiving coordinate data corresponding to individual operation keys of said key-in section, when the one character is input by a manual stroking operation on said key-in section, and for sequentially storing the coordinate data in such a manner as to divide the input character into its respective strokes;

standard pattern memory means for storing, as a standard pattern, character data of a character to be recognized and feature data determined by one of four directions including up, down, left and right, of each stroke of the character;

means coupled to said input pattern memory means, which forms feature data representative of one of the four directions, up, down, right or left, in which at least three keys are sequentially operated in each stroke of the input character;

means, coupled to said standard pattern memory means and said feature data forming means, for recognizing the keyed-in character by detecting the feature data stored in said standard pattern memory means which coincides with the feature data formed by said feature data forming means, and for selecting the corresponding character data stored in said standard pattern memory means.

8. A key-in device according to claim 7, wherein said standard pattern memory means stores second feature data relating to positions of the starting and ending points of each stroke of the character, as the standard pattern of the character to be recognized, along with that character data, and stores first feature data relating to the direction of each stroke of the character;

said means for forming said feature data forms said second feature data associated with the positions of the starting and ending points of each stroke and said first feature data of the direction of each stroke of the character from said input pattern; and said character recognizing means compares said first feature data and said second feature data.

9. A key-in device according to claim 8, wherein in the case of a one-stroke character the ending point of which is located in one of the four directions with respect to the starting point thereof by a distance corresponding to two or more keys, that direction is prepared as the second feature data of said input pattern;

in the case of a character having at least two strokes and the starting point of a preceding stroke is located in one of the four directions with respect to the starting point of a preceding stroke thereof by a distance corresponding to at least two keys, and the ending point of a subsequent stroke thereof is located in one of the four directions with respect to the ending point of a preceding stroke thereof by a distance corresponding to at least two keys, those respective directions are prepared as the second feature data of said input pattern;

the first feature data of said standard pattern is that data which is determined according to which of the four directions the respective stroke of the character is located;

the second feature data of said standard pattern is that data which is, in the case of the one-stroke character, determined dependent upon in which of the four directions the ending point of the stroke thereof is located with respect to the starting point thereof and in the case of the character having at least two strokes the associated items of data are those data which are determined according to which of the four directions the starting point of a subsequent stroke thereof is located with respect to the starting point of the preceding stroke thereof and in which of the four directions the ending point of the subsequent stroke thereof is located with respect to the ending point of the preceding stroke thereof.

10. A key-in device, comprising:

a key-in section including a matrix array of operation keys;

input pattern memory means, coupled to said key-in section, for storing an input pattern corresponding to at least one character by receiving coordinate data corresponding to individual operation keys of said key-in section, when the one character is input by a manual stroking operation on said key-in section, and for sequentially storing the coordinate data in such a manner as to divide the input character into its respective strokes;

standard pattern memory means for storing, as a standard pattern, character data of a character corresponding to at least numerals and arithmetic symbols and feature data associated with the direction of each stroke of the respective character;

means, coupled to said input pattern memory means, for forming the feature data associated with the direction of each stroke of the input character on the basis of the input pattern which is stored in said input pattern memory means;

means coupled to said standard pattern memory means and said feature data forming means, for recognizing the key-in character by detecting the feature data stored in the standard pattern memory means which coincides with the feature data prepared by the feature data preparing means, and for selecting the corresponding character data;

arithmetic operation means, coupled to said character recognizing means, for calculating an answer to a formula when the character data sequentially selected by said character recognizing means constitute a formula consisting of numerals and arithmetic symbols; and display means, coupled to said character recognizing means and said arithmetic oepration means, for. displaying the character data selected by said character recognizing means and a result calculated by said arithmetic operation means.

11. A key-in device according to claim 10, wherein said feature data of said input pattern and said standard pattern are defined when each stroke for the character takes any one of four directions including up, down, right or left.

12. A key-in device according to claim 10, wherein said feature data forming means forms feature data representative of one of the four directions, up, down, right or left, in which at least three keys are sequentially operated in each stroke of the input pattern; and the feature data stored in said standard pattern memory means are determined by the direction of each stroke of the character, up, down, right or left.

13. A key-in device according to claim 10, wherein said standard pattern memory means stores second feature data relating to positions of the starting and ending points of each stroke of the character, as the standard pattern of the character to be recognized, along with that character data, and stores the first feature data relating to the direction of each stroke of the character;

said means for forming said feature data forms said second feature data associated with the positions of the starting and ending points of each stroke, and said first feature data of the direction of each stroke of the character from said input pattern; and said character recognizing means compares said first feature data and said second feature data.

14. A key-in device according to claim 13, wherein, when at least three keys are relatively actuated in one of four directions, up, down, right or left, that direction is prepared as the first feature data of said input pattern;

when in the case of a one-stroke character the ending point of the character is located in one of the four directions with respect to the starting point thereof by a distance corresponding to at least two keys, that direction is prepared as the second feature data of said input pattern;

when in the case of a character having at least two strokes the starting point of a preceding stroke thereof is located in one of the four directions with respect to the starting point of a preceding stroke thereof by a distance corresponding to at least two keys and the ending point of a subsequent stroke thereof is located in one of the four directions with respect to the ending point of a preceding stroke thereof by a distance corresponding to at least two keys, those respective directions are prepared as the second feature data of said input pattern;

the first feature data of said standard pattern is that data which is determined according to which of the four directions the respective stroke of the character is located;

the second feature data of said standard pattern is that data which is, in the case of the one-stroke character, determined according to which of the four directions the ending point of the stroke thereof is located with respect to the starting point thereof and in the case of the character having at least two strokes the associated items of data are those data which are determined according to which of the four directions the starting point of a subsequent stroke thereof is located with respect to the starting point of the preceding stroke thereof and in which of the four directions the ending point of the subsequent stroke thereof is located with respect to the ending point of the preceding stroke thereof.

* * * * *

UNITED STATES PATENT AND TRADEMARK OFFICE
CERTIFICATE OF CORRECTION

PATENT NO. : 4,578,811

DATED : March 25, 1986

INVENTOR(S) : Naoki INAGAKI

It is certified that error appears in the above-identified patent and that said Letters Patent is hereby corrected as shown below:

COLUMN 11 (Table 3), line 40, change "YX-coordinate" to --Y-coordinate--.

Signed and Sealed this

Twelfth Day of August 1986

[SEAL]

Attest:

DONALD J. QUIGG

Attesting Officer

Commissioner of Patents and Trademarks